June 19, 1962   J. F. HUFF ETAL   3,040,279
SENSITIVITY ADJUSTMENT
Filed March 17, 1958
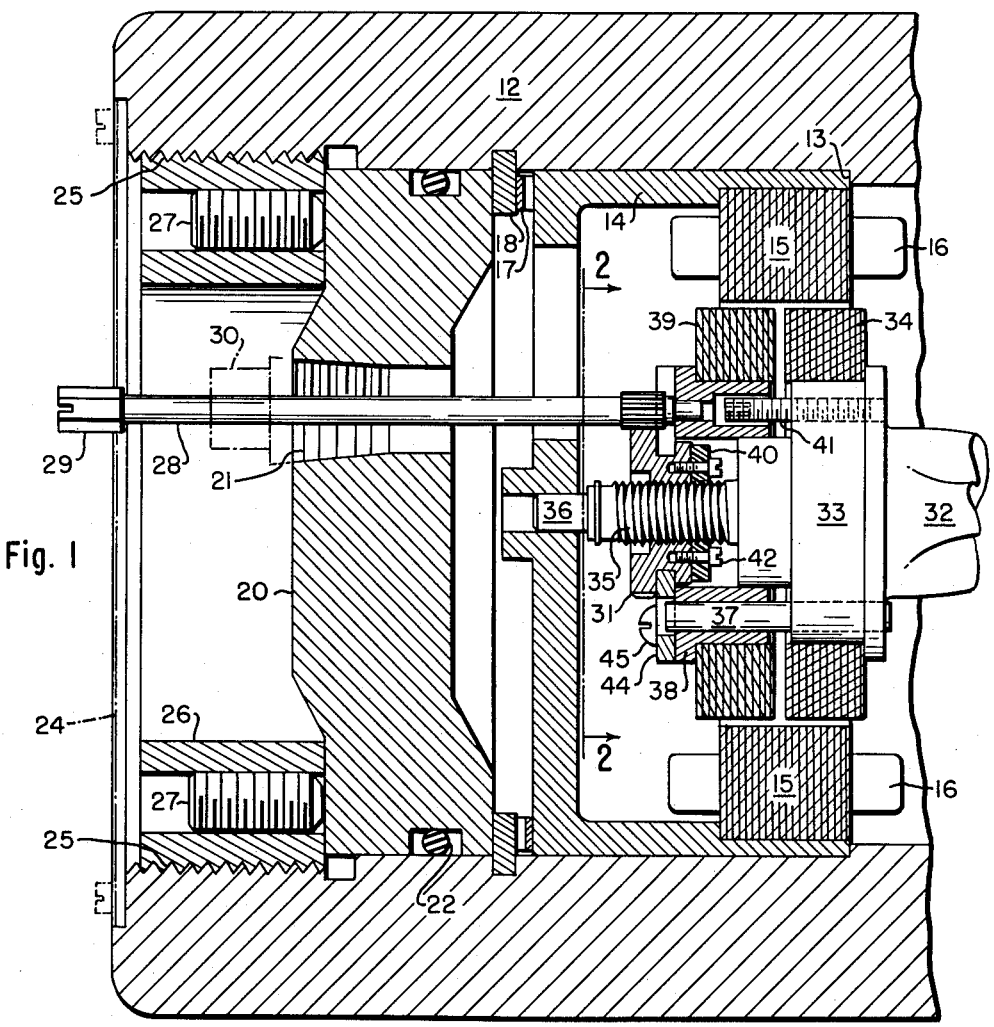
Fig. I
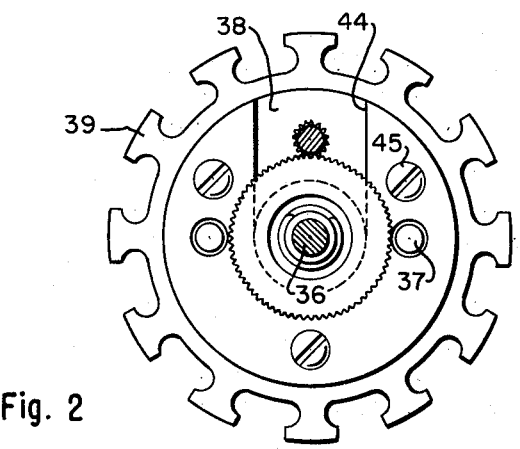
Fig. 2
INVENTORS
JOSEPH F. HUFF
ROBERT H. ROETHLISBERGER
BY
ATTORNEYS

| United States Patent Office | 3,040,279
Patented June 19, 1962 |
|---|---|

3,040,279
SENSITIVITY ADJUSTMENT
Joseph F. Huff, Hyde Park, and Robert H. Roethlisberger, Needham, Mass., assignors to American Radiator & Standard Sanitary Corporation, New York, N.Y., a corporation of Delaware
Filed Mar. 17, 1958, Ser. No. 721,934
4 Claims. (Cl. 336—30)

This invention relates in general to variable dynamo transformers, and in particular to the adjustment of sensitivity in such devices.

A fairly comprehensive discussion of variable dynamo transformers is found in United States Patent No. 2,488,734 to Robert K. Mueller, which was issued November 22, 1949. Much relating to the operational theory and structure of such variable transformers is contained in that patent. For purposes of understanding the present invention, the theory and structural detail will be touched upon only briefly.

The basic structure of a dynamo transformer includes a stator and a rotor, both of which are usually constructed of laminations of magnetic material. Although stators of other shapes or configurations have been proposed and built, the stator is generally annular and includes a plurality of reentrant poles. The rotor is pivoted or journaled in suitable bearings about an axis at the center of the stator frame. Each of the stator poles is provided with one or more windings which are connected in various ways depending upon the purpose to which the device is to be put.

The features of sensitivity adjustment incorporated in the present invention may be applied to any one of the variable dynamo transformers including torque motors, stiffness motors, pick-offs, etc. However, to avoid confusion and simplify understanding, the invention will be described with reference to only a single type of variable dynamo transformer in which it may be advantageously incorporated. Nevertheless, it will be understoood that the availability of sensitivity adjusting means is important and valuable in any device of the general character of a variable dynamo transformer.

The theoretical basis of the devices is relatively simple. First, despite the number and configuration of coils used in conjunction with the stator, the self-inductance for each input to those coils is substantially constant for all angular positions of the rotor within the limited working range of the rotor. Second, the mutual inductance varies according to some function with displacement of the rotor from a given neutral position. If it be assumed that the entire magnetic reluctance is concentrated in the air gaps between stator poles and rotor, as is substantially true, it is obvious that the reluctance of flux paths through the rotor and the stator is vitally affected by the position of the rotor relative to the stator. It is also obvious that, to have a reasonable useful range, a sensitivity adjustment for the device should be operative upon the air gap, since it is in the air gap that the reluctance is concentrated.

It is, therefore, an object of the present invention to provide a device for varying the sensitivity of a dynamo transformer.

It is a further object of the present invention to provide adjustable sensitivity in dynamo transformers without variation of other electrical characteristics.

It is a further object of the present invention to provide means for adjusting the sensitivity of a dynamo transformer after the transformer is incorporated in, and enclosed with, other mechanisms.

The invention includes in general, a stator which is of more or less conventional design and a rotor which is split by a plane normal to its axis into two similar portions. The two portions are arranged to permit axial relative movement between one another. One portion is fixed directly to a drive member which provides the variable in the form of angular displacement of the rotor relative to the stator. The other portion is also fixed to the drive member and is maintained in alignment at all times with the fixed portion. A nut, threaded internally and having external teeth or serrations, is attached to the movable portion of the rotor and may be rotated to provide axial movement of that portion of the rotor relative to the fixed portion. Various locking and anti-backlash features are incorporated in the device in order that the position at which the movable portion of the rotor is set will remain constant. A tool is provided to rotate the threaded nut from a point external to the entire device. For a better understanding of the invention together with other and further objects, features and advantages, reference should be made to the accompanying drawings which illustrate a preferred embodiment of the invention, and in which:

FIG. 1 is a sectional side elevation of apparatus in which the invention has been incorporated, and FIG. 2 is a plan view of the rotor of the variable dynamo transformer of the apparatus taken along the lines 2—2 of FIG. 1.

The device which is shown fragmentarily in FIG. 1 is actually a pressure transmitter, a component of which is a variable dynamo transformer having adjustable sensitivity. A cylindrical housing or case 12 contains the entire apparatus, but only that portion of the housing which surrounds the embodiment of this invention is illustrated. Several internal steps are formed in the case 12 to locate and support various elements of the apparatus. A stator housing 14 abuts one of the steps 13. It is a cup-shaped member closely fitted within the case 12 and supports a stator 15 amongst other things. Only two opposite teeth of the stator are seen in the sectional view which constitutes FIG. 1 of the drawing. However, it is to be understood that the stator, as is common in devices of this general character includes a plurality of symmetrical reentrant teeth or poles about which coils 16 are wound. The stator housing is maintained in position against the internal flange or step 13 by means of a Bellville washer 17 and a retaining ring 18 which is recessed into the inner surface of the housing 12. A sealing plate 20 is disposed against the retaining ring 18 and the sealing plate is provided with an opening 21 parallel to its axis. The center of the sealing plate is relieved internally to provide clearance for other parts of the device which are described in greater detail hereinbelow. A peripheral groove formed in the sealing plate contains an O ring 22 to provide a seal between the plate and the case.

The end of the case 12 is closed by a cover plate 24 which may be held by screws threaded into the case or otherwise retained in place. The opening in the housing adjacent the cover plate 24 is internally threaded as at 25. A spanner nut 26 engages the threads 25 and bears upon the sealing plate 20. The spanner nut is provided with at least two openings adjacent its periphery in which similar headless locking screws 27 are threaded. A tool 28 having a slotted end cap 29 is shown extending through the opening 21 in the sealing plate. The cover 24 may be provided with a normally capped opening through which the tool 28 may extend, or the cover may be designed to be removable from the case 12 to permit insertion of the tool. A pipe plug 30, shown in dashed lines, is provided for sealing the opening in the sealing plate 20 when the tool is not in place. On the periphery of the inner end of the tool 28 is a toothed or serrated section which engages a similarly toothed or serrated portion of an adjusting nut 31. The inner end of the tool 28 is journaled in an opening adjacent the adjusting nut as is explained below.

Understanding of the pressure transmitter in which the present invention is incorporated in the illustrated embodiment may be facilitated by a brief description of that portion of the device. The end of a pressure responsive element such as a twisted Bourdon tube is shown fragmentarily at 32. The Bourdon tube 32 is brazed or otherwise firmly attached to an adaptor 33 which supports a fixed rotor portion 34. The adaptor 33 includes a series of stepped sections, a threaded section 35 and a pivot shaft section 36 journaled in a central opening in the stator housing 14. A pair of locating dowels of which dowel pin 37 is typical are disposed at diammetrically opposite points in the fixed rotor portion 34. Slidably fitted on the dowel pins is a movable support element 38. A movable rotor section 39 which is identical to, and aligned with, the fixed rotor portion 34 is carried by the supporting element 38. A locking screw 41 is threaded into the flanged adaptor section 33 and extends upwardly into an opening formed in the support element 38. The opening into which the screw 41 extends in support section 38 is an enlarged continuation of the opening in which the tool 28 is journaled. The purpose of aligning these two openings is explained below in the description of the operation of the sensitivity adjusting mechanism.

The adjusting nut 31 is also threaded internally and engages the shaft section 35. The nut 31 is maintained in reasonably tight engagement with the shaft section 35 by means of a locking plastic annular member 40 held to the end of the adjusting nut by means of screws such as shown at 42. A peripheral groove is formed in the nut 31 and in it there is fitted a yoke in the form a flat C-washer 44. A number of holes are drilled through the C-washer about its periphery to permit its attachment to the movable rotor section and to clear the dowel pins as shown in FIG. 2. The C-washer is engaged by the peripheral groove of the adjusting nut 31 and is attached to the movable stator section by a group of screws such as 45 spaced about its periphery.

The normal operation of the pressure transmitter apart from sensitivity adjustment is quite straightforward. Pressure exerted within the twisted Bourdon tube causes a rotation of the rotor relative to the stator. A simple means of detecting that rotation and its magnitude is provided by a pair of coils wrapped upon the poles of the stator 15. A reference signal is impressed on the input or primary coils and an output is taken from the secondary coils. The output signal is similar to the input signal but varies in magnitude or in other characteristics determined primarily by the configuration of the stator, the direction and type of coils wrapped thereon, and especially the position of the rotor relative to the stator.

Now, however, in a device such as that illustrated, if it is desired to vary or adjust the sensitivity, the cover 24 is removed from the housing. The tool 28 is inserted through the opening 21 and its end is placed in the opening formed in the rotor support member 38. The teeth of serrations on the enlarged section of the tool 28, are engaged by the external teeth or serrations on the adjusting nut 31. Rotation of the tool 28 which may be achieved by a screw driver in the slotted end section 29, causes rotation of the adjusting nut 31 which is slower and in the opposite direction to that of the tool. As the adjusting nut 31 is rotated, it ascends or descends the threaded section 35 which it engages internally. Because the C-washer 44 is held in the peripheral groove of the adjusting nut 31, it travels with the adjusting nut. The C-washer is of course, also firmly attached to the movable rotor support element 38 which causes that section and the rotor 39 carried thereon to move axially with the adjusting nut 31. The adjusting nut 31 of course, rotates relative to the C-washer and the structures attached thereto. Relative rotation between the movable rotor section 39 and the fixed rotor section 34 is prevented by the pins 38 which engage the openings of the rotor support section 38 quite closely.

It is clear that as the movable rotor portion is moved in a direction toward the cover of the housing, the separation between the movable portion and the fixed portion becomes greater. Furthermore, less and less of the projected area of the movable rotor section is on the stator 15. When the separation is greatest, the distance between a major portion of the movable rotor section and the stator is considerable and the effective air gap is quite large. Accordingly, the sensitivity of the device becomes greatly decreased. When the gap between the fixed and movable rotor portions is at a minimum, the projected area of the entire rotor on the stator is at its maximum and sensitivity is the greatest obtainable.

The maintenance of an adjusted position of the movable rotor portion 39 relative to the fixed rotor portion 34 is not dependent only upon the annular plastic member 40. The locking screw 41 may be backed off to cause its head to engage the reduced part of the opening in which it is disposed. Rotation of the locking screw is effected by means of an Allen wrench after the removal of the adjusting tool 28.

Although the invention has been described and illustrated in connection with an embodiment having a split rotor, in some situations it may be desirable to move the entire rotor relative to the stator or perhaps even to move the entire stator or a portion of it relative to the rotor to vary the projected area of the rotor on the stator. These and other modifications which will immediately suggest themselves to those skilled in the art are believed to be within the sphere of the present invention. The invention should be limited, then, only by the spirit and scope of the appended claims.

What is claimed is:

1. In a variable dynamo transformer, the combination of a stator composed of laminations of magnetic material having coils wound thereon, a rotor disposed within and coaxial of said stator, said rotor being mounted for limited rotation relative to said stator, means for rotating said rotor in response to an external influence, means for adjusting the axial position of at least a portion of said rotor relative to said stator along the common axis thereof, and means for locking said portion of said rotor in any one of a range of positions along with common axis relative to said stator.

2. In a device for converting angular motion of a shaft into an electrical signal, a variable dynamo transformer comprising a stator, a rotor axially separable into two portions, said rotor being mounted on said shaft for rotation within said stator, one of said portions being directly and permanently affixed to said shaft, said shaft having a threaded end extending beyond said first portion, a yoke attached to the other of said portions, an adjusting nut threaded internally and having a serrated exterior, said nut also having a peripheral groove formed therein and receiving said yoke, the internal threads of said nut engaging said threaded end of said shaft, and a tool having a serrated end for engaging the exterior of said nut to vary the separation of said portions of said rotor.

3. Apparatus as in claim 2 including an annular plastic locking member attached to said nut and also engaging said threaded end of said shaft.

4. Apparatus as in claim 3 including a locking screw threaded into said one of said portions and adapted to contact a point on the other of said portions of said rotor.

References Cited in the file of this patent

UNITED STATES PATENTS

| | | |
|---|---|---|
| 2,488,734 | Mueller | Nov. 22, 1949 |
| 2,717,364 | Hodgin | Sept. 6, 1955 |
| 2,738,434 | Couzens | Mar. 13, 1956 |

FOREIGN PATENTS

| | | |
|---|---|---|
| 28,426 | France | Nov. 15, 1924 |
| 298,481 | Germany | Sept. 9, 1919 |